Sept. 23, 1958  C. H. JORGENSEN ET AL  2,852,913
AUTOMATIC MECHANISM FOR CONTROLLING FUEL FLOW TO A JET ENGINE
Filed Oct. 15, 1951  9 Sheets-Sheet 1

Fig. 1

Clarence H. Jorgensen
Willard T. Nickel
Howard H. Dietrich
John M. Barr
INVENTORS BY Willits Hardman
and Fehr
their attorneys Sept. 23, 1958   C. H. JORGENSEN ET AL   2,852,913
AUTOMATIC MECHANISM FOR CONTROLLING FUEL FLOW TO A JET ENGINE
Filed Oct. 15, 1951   9 Sheets-Sheet 4

Sept. 23, 1958 C. H. JORGENSEN ET AL 2,852,913
AUTOMATIC MECHANISM FOR CONTROLLING FUEL FLOW TO A JET ENGINE
Filed Oct. 15, 1951 9 Sheets-Sheet 5

Clarence H. Jorgensen
Willard T. Nickel
Howard H. Dietrich
John M. Barr
INVENTORS BY Willits Hardman
and Fehr
their attorneys Sept. 23, 1958   C. H. JORGENSEN ET AL   2,852,913
AUTOMATIC MECHANISM FOR CONTROLLING FUEL FLOW TO A JET ENGINE
Filed Oct. 15, 1951   9 Sheets-Sheet 6

Clarence H. Jorgensen
Willard T. Mickel
Howard H. Dietrich
John M. Barr
INVENTORS

BY Willits, Hardman
and Fehr
their attorneys

Sept. 23, 1958　　C. H. JORGENSEN ET AL　　2,852,913
AUTOMATIC MECHANISM FOR CONTROLLING FUEL FLOW TO A JET ENGINE
Filed Oct. 15, 1951　　9 Sheets-Sheet 7

Fig. 14

Clarence H. Jorgensen
Willard P. Nickel
Howard H. Dietrich
John M. Barr
INVENTORS BY Willets Hardman
and Fehr
their attorneys United States Patent Office 2,852,913
Patented Sept. 23, 1958

2,852,913

AUTOMATIC MECHANISM FOR CONTROLLING FUEL FLOW TO A JET ENGINE

Clarence H. Jorgensen, East Rochester, and Willard T. Nickel, Howard H. Dietrich, and John M. Barr, Rochester, N. Y., assignors to General Motors Corporation, Detroit, Mich., a corporation of Delaware Application October 15, 1951, Serial No. 251,377

28 Claims. (Cl. 60—39.28)

This application relates to the control of jet engines of the turbo-compressor type and an object is to provide a control of the fuel passing to the burners in accordance with a plurality of conditions, namely, engine speed, engine temperature, altitude, ambient air temperature and the pressure of the fuel delivered to the burners.

Pursuant to obtaining this object of the present invention, a further object of the invention is to provide a mechanized calculator which effects a mechanical movement used to control a by-pass valve, which movement is the resultant of more than two mechanical movements imparted to the calculator. In the disclosed embodiment thereof, the calculator provides four movement-receiving members and a fifth member which imparts a mechanical movement which is the resultant of motions which may be imparted respectively to the four members.

In the disclosed embodiment of the burner fuel controller, two of the four movement-receiving members of the calculator are actuated, respectively, in accordance with conditions of engine speed and engine temperature. Another of the movement-receiving members is actuated in accordance with burner fuel pressure and ambient air temperature and one of the movement-receiving members is fixed in a position of adjustment. The fifth member is used to effect control of a valve which by-passes burner fuel from the duct which connects a fuel pump with the burners. This by-pass valve is also under control by altitude conditions through the use of apparatus such as disclosed in the copending application of Jorgensen et al. Serial No. 199,236, filed December 5, 1950 (now abandoned). Said apparatus includes a manually operated fuel throttle valve by which demanded amounts of fuel are substantially obtained, the exact amounts being obtained in consequence of automatic control of the by-passing valve.

A further object of the invention is to provide for safe operation of the engine in case of failure of the engine speed sensing or engine temperature sensing apparatus to function properly. In the disclosed embodiment of the present invention, this object is accomplished by the use of means which disconnect the calculator from the engine speed sensing or engine temperature sensing apparatuses and means which sets the calculator in a position such that control of fuel can be continued by the devices which sense altitude, ambient air temperature and burner fuel pressure. In such emergency, excessive engine speed and temperature can be avoided by manipulation of the manually operated fuel valve.

Further objects and advantages of the present invention will be apparent from the following description, reference being had to the accompanying drawings, wherein a preferred embodiment of the present invention is clearly shown.

Figure 1:
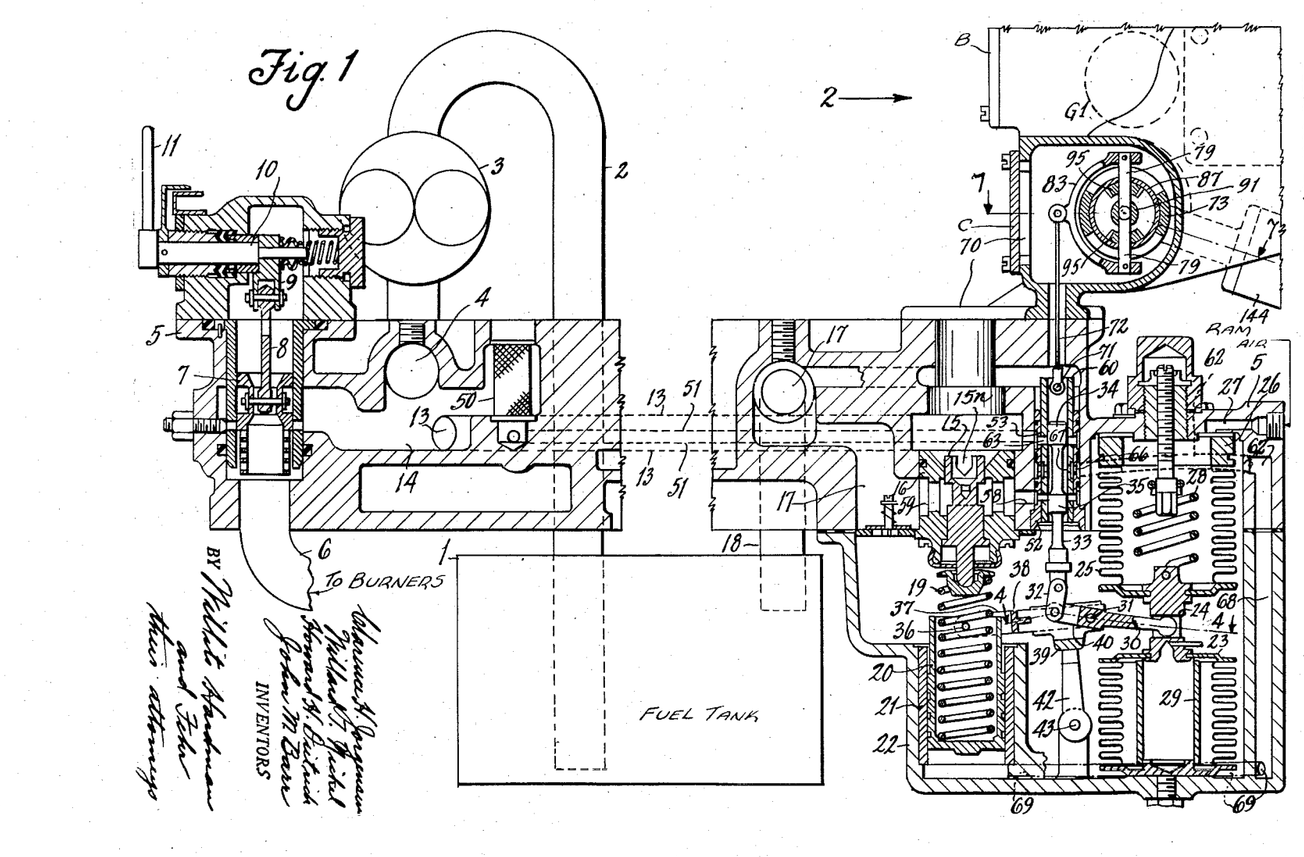
Fig. 1 is a diagram partly in section showing the fuel by-passing valve and control therefor in accordance with the present invention.

Referring to Fig. 1, a burner fuel tank 1 is connected by pipe 2 with the inlet of a pump 3 driven by the engine turbine which drives the compressor for supplying air under pressure to the burners. The outlet of pump 3 is connected with a passage 4 in a housing 5 which makes connection with a pipe 6 leading to the burner fuel manifold, not shown. The flow of fuel from passage 4 to pipe 6 is controlled by a manually positioned valve 7 constructed as disclosed in the Jorgensen application referred to. Valve 7 is connected by a link 8 with a crank 9 connected to a shaft 10 operated by a manually operated lever 11. Passage 4 is connected through chamber 14 with passage 13 which a by-passing valve 15 having fuel metering notches 15n, guided by a cage 16, may connect with a passage 17 connected with a pipe 18 for returning the by-passed fuel to the tank 1. The pressure of fuel in the chamber 14 which is communicated to valve 15 by passage 13 tends to open the valve 15 and the extent of its opening is dependent upon the state of compression of a spring 19 which opposes opening movement of valve 15. Spring 19 bottoms in a piston 20 slidable in a cylinder 21 supported by a housing 22 which supports an aneroid 23 connected by a bar 24 with the movable end of a bellows 25 whose upper end is fixed to a ring 26 attached to the housing 5. Passage 27 in housing 5 provides for connection with a passage through which air enters at the front of the airplane and is delivered by the compressor to the burners. The bellows 23 and 25 being in an equally exposed area, the bar 24 connecting the bellows changes position in accordance with impact pressure which varies in accordance with air density. Expansion of bellows 25 is resisted by a spring 28 and contraction of bellows 23 upon increase in altitude pressure is limited by stop tube 29.

Figure 4:
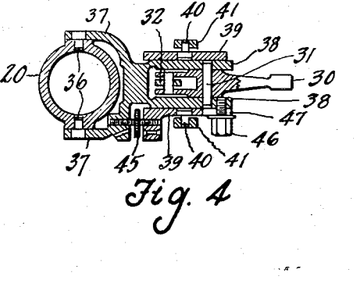
Fig. 4 is a sectional view on line 4—4 of Fig. 1, spring 19 being omitted.

The notch in bar 24 receives the curved end of a lever 30 pivoted on a pin 31 and connected by a link 32 with the stem of a valve 33 having lands 34 and 35. Piston 20 is connected by diametrically opposite studs 36 (Fig. 4) with bifurcations 37 of a yoke branching from a stem 38 which carries the pivot pin 31 and which is longitudinally adjustable on a cradle 39 pivoted on pins 40 carried by the bifurcations 41 (Fig. 4) of a yoke integral with a lever 42 pivotally supported on a pin 43 eccentric to a supporting screw 44 (Fig. 6) threaded through housing 22 to provide adjustment vertically of the pin 43. Screw 44 is secured in adjusted position by a set screw 44a and a lock nut 44b. The cradle 39 is adjusted longitudinally relative to the stem 38 of yoke 37 by the turning of a disc 45 (Fig. 4) integral with oppositely threaded screws received in oppositely threaded holes in the yoke 37 and the cradle 39. The cradle 39 is secured to the stem 38 in the desired position of adjustment by the tightening of a screw 46 passing through a notch 47 and in the cradle and threadedly engaging the stem 38.

Passage 4 is connected through a filter 50 (Fig. 1) with a passage 51 connecting the groove 53 (Fig. 6) of a valve guide 52 having also grooves 54 and 55. Grooves 53, 54 and 55 are connected with the interior of the guide by ports 53a, 54a and 55a, respectively. Ports 53a connect with the ports 63 of a sleeve valve 60. Ports 55a connect with ports 65 of valve 60. Ports 54a connect with a groove 66 of valve 60 connected by ports 67 with the interior of valve 60. Lands 34 and 35 of valve 33 control ports 63 and 65 respectively. Groove 54 is connected by passage 62 in housing 5 (Fig. 1) and passages 68 and 69 in housing 22 with the lower end of cylinder 21. Groove 55 is connected by a passage 58 with an annular groove 59 provided by valve cage 16, said groove being connected with the by-pass passage 17.

As shown in Fig. 1, the spool valve 33 is in equilibrium position with respect to the sleeve valve 60. Assuming that the position of valve 60 does not change, when altitude increases and air density decreases, bar 24 moves up thereby causing lever 30 to move counterclockwise about its pivot pin 31 thereby causing valve 33 to move down and unblock ports 65 thereby connecting the lower end of cylinder 21 with by-pass 17 whereupon the spring 19 is permitted to expand and force the piston 20 downwardly to cause liquid to flow out through the passages 69, 68 and 62, groove 54, ports 54a, groove 66, ports 67, ports 65, ports 55a, groove 55, passage 58 to the passage 17. The compression of spring 19 being reduced, valve 15 opens wider to increase the by-passing and decrease the flow of fuel to the burner as required when air density decreases. As the piston 20 moves down, the yoke 37 moves downwardly and pivots on the pin 40 thereby raising the pin 31 and the valve 33 to return it to a position of equilibrium in which it blocks further discharge of liquid from the cylinder 20. In this way, the increase of by-passing action is commensurate with the increase of altitude or decrease in air density and decrease in impact pressure. Conversely, when altitude decreases, the impact pressure increases, the bar 24 moves down to cause the lever 30 to move clockwise about its pivot 31 thereby raising the valve 33 to unlock the ports 63 so that liquid under pressure can flow from passage 51 to the cylinder 26. This causes piston 20 to move up to increase the compression of spring 19 opposing downward movement of valve 15 so that its by-passing action is decreased. Therefore the flow of fuel to the burners will increase as required as the air density increases. As piston 20 moves up the yoke 37 which pivots on pin 40 moves clockwise thereby causing pin 31 to move down and valve 33 to return to a position of equilibrium blocking further flow of pressure fluid to the cylinder 20. In this way, the decrease of by-passing action and increase of fuel flow to the burners is commensurate with the decrease in altitude or increase in impact pressure.

The motorized control unit

Figures 5, 6, 6A:
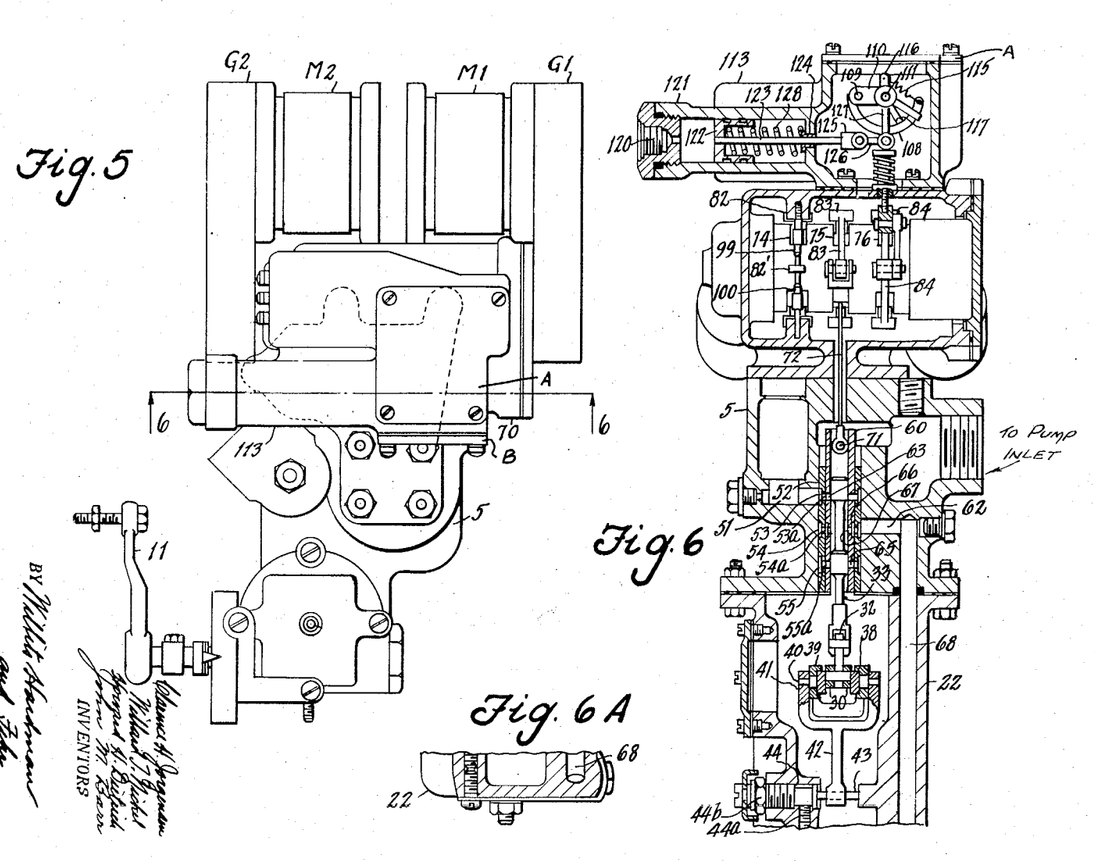
Fig. 5 is a view in the direction of arrow 5 of Fig. 2.
Figs. 6 and 6A form a sectional view, on line 6—6, of Fig. 5.
Figures 7, 8, 9:
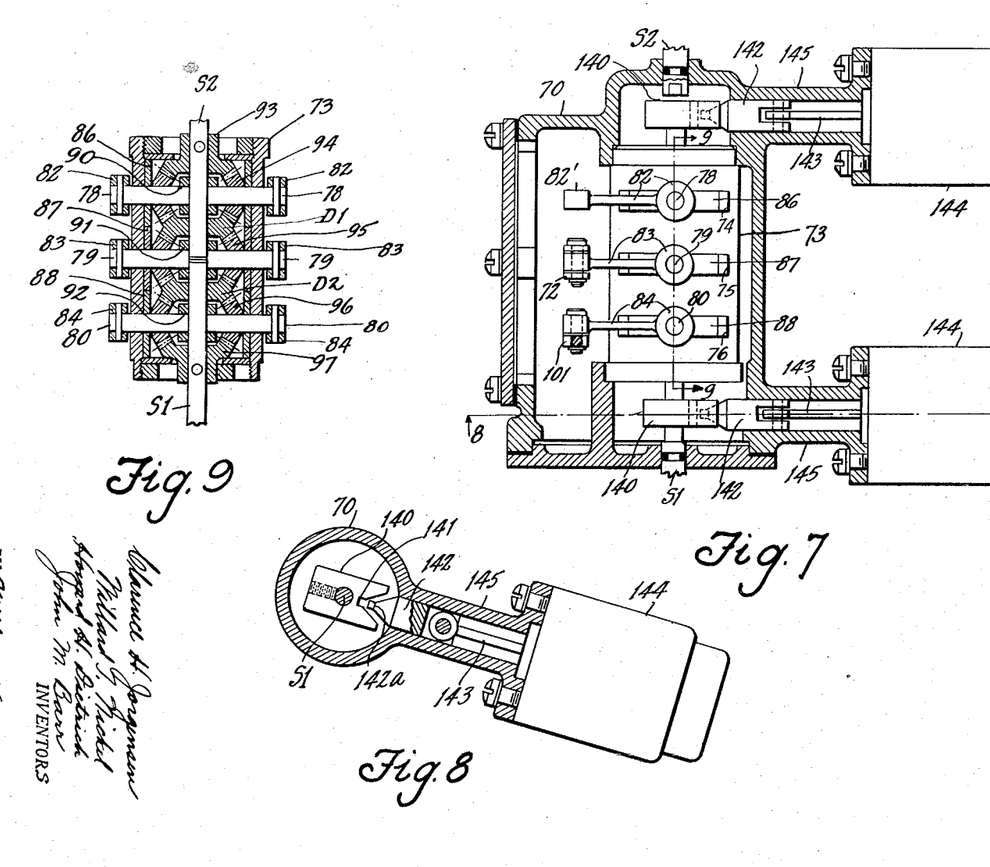
Fig. 7 is a sectional view on line 7—7 of Figs. 1 and 3.
Fig. 8 is a sectional view on line 8—8 of Fig. 7.
Fig. 9 is a fragmentary, sectional view on line 9—9 of Fig. 7.
Figures 10, 11:
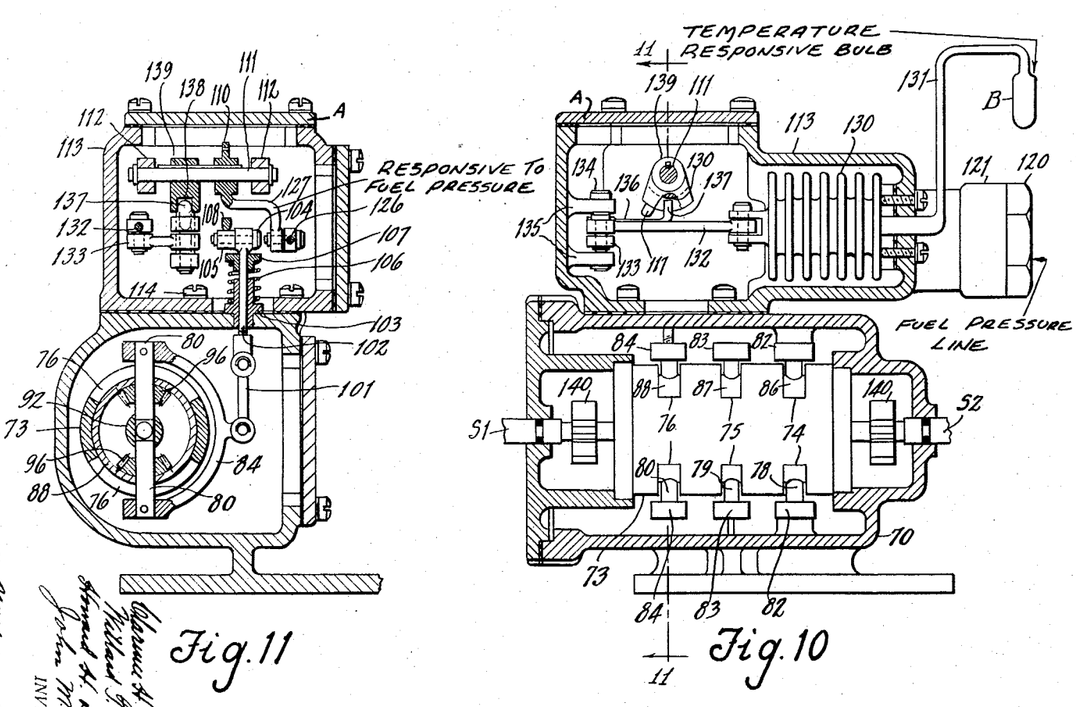
Fig. 10 is a somewhat enlarged sectional view on line 10—10 of Fig. 3.
Fig. 11 is a sectional view on line 11—11 of Fig. 10.

Referring to Figs. 1 and 6, the housing 5 supports a housing 70 for an instrument which is connected with sleeve valve 60 by a pin 71 and a rod 72 in order that fuel by-passing will be controlled also in accordance with other conditions, such as, turbine speed, turbine temperature, ambient air temperature and burner fuel pressure. In order that the rod 72 will be controlled in accordance with all these conditions, it is associated with a calculating device, the longitudinal sectional view of which appears in Fig. 9. This calculator comprises a barrel 73 having, as shown in Figs. 10, 11 and 7, three sets of diametrically opposite slots 74, 75 and 76 which receive, respectively, pairs of rods 78, 79 and 80 attached, respectively, to yokes 82, 83 and 84. The pairs of rods 78, 79 and 80 pass, respectively, through sleeves 86, 87 and 88 and terminate in recesses provided, respectively, by hub-blocks 90, 91 and 92 having, as shown in Fig. 9, holes in horizontal alignment for receiving shafts S1 and S2 which meet at the center of block 91. Shaft S2 drives a bevel gear 93 meshing with bevel gears 94 journaled on rods 78 and which mesh with a double bevel gear D1 loosely journaled on shaft S2 and meshing with bevel gears 95 journaled on rods 79 and meshing with a double bevel gear D2 journaled loosely in shaft S1 and meshing with bevel gears 96 which mesh with a bevel gear 97 driven by shaft S1. The barrel 73 is supported by housing 70 and a cover 98 (Figs. 7 and 10) through which shaft S1 extends.

Referring to Fig. 5, the shaft S1 is connected with an electric motor M1 by speed reducing gearing and a solenoid controlled clutch enclosed in a gear case G1. Similarly, the shaft S2 extends through the closed end wall of housing 70 and is connected with an electric motor M2 by speed reducing gearing and a solenoid controlled clutch enclosed in a gear case G2. As described hereinafter, motor M1 is controlled by apparatus which senses turbine speed and motor M2 by apparatus which senses turbine temperature.

If yokes 82 and 84 remain fixed, the center yoke 83 moves around the axes of shafts S1 and S2 in a manner which is the resultant of the movements imparted to the calculator by shafts S1 and S2. Yoke 83 (Fig. 1) is attached to rod 72 whereby the movement imparted to the sleeve valve 60 is the automatically calculated resultant of the angular movements of shafts S1 and S2 which are controlled, respectively, by speed and temperature conditions.

The yoke 82 is provided with a lug 82″ (Figs. 6 and 7) which is located between stop screws 99 and 100 which can be turned so as to locate the yoke 82 in a predetermined position for an initial factory adjustment.

As shown in Fig. 11, the yoke 84 is connected by a link 101 with a rod 102 slidable in a bushing 103 and supporting a screw 104 carrying a roller 105 which a spring 106, located between the bushing 102 and a washer 107, urges upwardly into contact with a cam 108. As shown in Fig. 6, cam 108 is pivotally supported at 109 by a lever 110 keyed to a shaft 111 journaled in bearings 112 (Fig. 11) provided by housing 113 which screws 114 attach to housing 70. A spring 115 (Fig. 6) connected with an arm 116 integral with lever 110 and connected with the cam 108, urges this cam toward a stop 117 which, by means to be described, is adjustable axially of the shaft and is so shaped as to adjust the cam 108 about the pivot 109. Cam 108 is rotated bodily about the axis of shaft 111 by a device responsive to the pressure of fuel flowing to the burner. This fuel pressure line, not shown, is connected by a pipe threaded into a bushing 120 which is attached to a cylinder 121 provided by housing 113. Cylinder 121 receives a piston 122 connected by a rod 123 passing through a bushing 124, a clevis 125 and a link 126 with a lever arm 127 integral with the lever 110. A spring 128 opposes movement of piston 122 toward the right under the action of fuel pressure. As the pressure of liquid in the cylinder 121 increases, lever 127 and cam 108 are moved counterclockwise; and, as pressure in cylinder 121 decreases, spring 128 moves cam 108 clockwise. The motion of cam 108 imparts, through the roller 105, rod 102 and link 101, angular motion to the yoke 84. Through the rod 72, the sleeve valve 60 is controlled also in accordance with fuel pressure which is a function of turbine speed.

The control of rod 72 by cam 108 is modified in accordance with ambient air temperature. A temperature bulb B (Fig. 10) and the bellows 130 and the pipe 131 connecting it with the bulb, are filled with a liquid having a relatively high temperature coefficient of expansion. The free end of bellows 130 is connected by a link 132 with one arm 133 of a bell crank lever pivoted on a screw 134 supported by lugs 135 integral with housing 113. The other arm 136 (Figs. 10 and 11) of the bell crank lever has a projection 137 received by an annular groove 138 in a block 139 slidable on shaft 111 and keyed thereto. Stop 117, which is attached to block 139, is shaped so that it moves the cam 108 away from shaft 111 when block 139 is moved in one direction and permits spring 115 to move the cam 108 closer to the shaft 111 when block 139 is moved in the opposite direction. In this way the yoke 84 (Fig. 11) is caused to rotate about the axis of the differential gear housing or barrel 73 in response to changes in ambient air temperature and burner fuel pressure.

Referring to Figs. 7 and 8, each of the shafts S1 and S2 is attached to a plate 140 having a V-notch at the apex of which there is a narrow notch 141 adapted to be received by the end portion 142a of a plunger 142 connected by a link 143 with the armature of a solenoid 144 supported by an extension 145 of housing 70. So long as power is available for operating the motors M1 and M2, the solenoids 144 are energized so as to retract the plungers 142 from the notches 141 of plates 140 so that the shafts S1 and S2 are free to be controlled by the motor.

Figure 12:
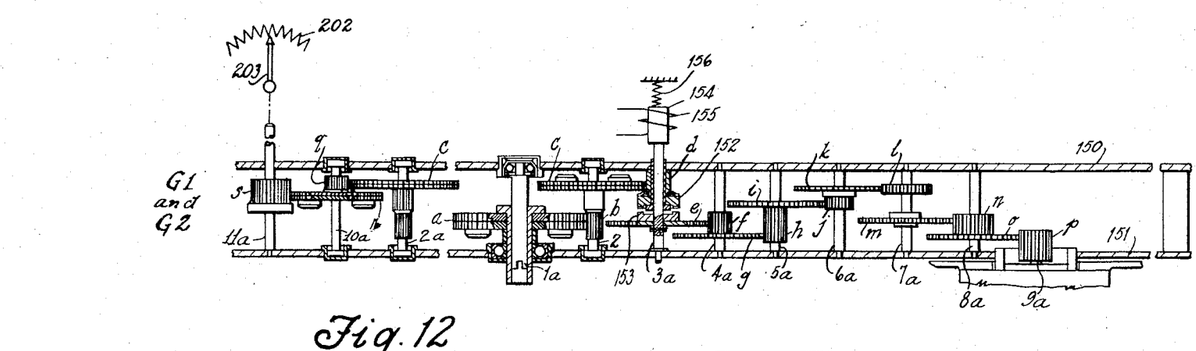
Figs. 12 and 13 are diagrammatic views of gearing by which the calculator is connected with electric motors which respectively receive engine speed and engine temperature signals.
Figure 13:
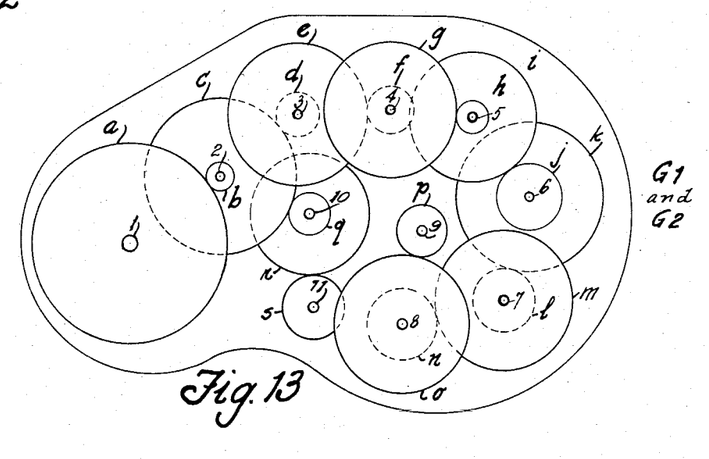

Referring to Figs. 12 and 13, the gearing in each of the cases G1 and G2 includes shafts 1a to 9a supported by plates 150 and 151. Shafts 1a connect with shafts S1 and S2, respectively. Shafts 9a are the armature shafts of motors M1 and M2, respectively. The shafts 1a—9a support meshing gears a—p. Gear d is connected with a clutch jaw 152 adapted to be engaged by a clutch jaw 153 fixed to gear e which is fixed to shaft 3a which is axially movable. Shaft 3a is connected with the armature 154 of a solenoid 155 which, when energized, effects engagement of the clutch jaws 152, 153. When this solenoid is deenergized, a spring 156 separates the clutch jaws.

When the electrical source for operating the motors M1 and M2 is functioning, the solenoids 155 are energized and the clutches in the gear cases G1 and G2 are energized; and the solenoids 144 are energized to retract the plungers 142 against the action of springs (not shown) so that shafts S1 and S2 may be moved by the motors M1 and M2, respectively. In case of failure of this electrical source, the clutches in gear cases G1 and G2 are disengaged and the solenoids 144 are deenergized to permit springs enclosed therein to move the plungers 142 into full engagement with the plates 140, thereby locating the shafts S1 and S2 in neutral positions so that the differential or calculating mechanism is under control only by burner fuel pressure and ambient air temperature. The apparatus is left with control responsive to burner fuel pressure, ambient air temperature and altitude. The fuel throttle valve 7 (Fig. 1) can be manually operated during this emergency to prevent overspeed and over-temperature of the turbine.

Each gear case G1, G2 includes a shaft 10a supporting a gear q meshing with gear c and driving a gear r meshing with a gear s which drives a shaft 11a which moves the wiper or slider 203 of a rheostat 202 (Fig. 12) for a purpose to be described.

Figure 2:
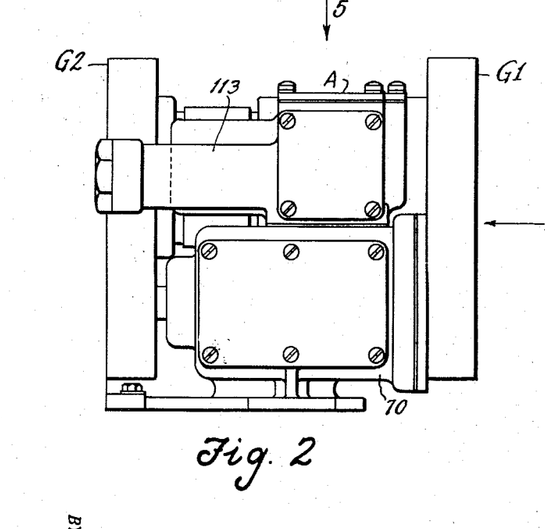
Fig. 2 is a view in the direction of arrow 2 of Fig. 1 of the upper part of the device shown in Fig. 1.
Figure 3:
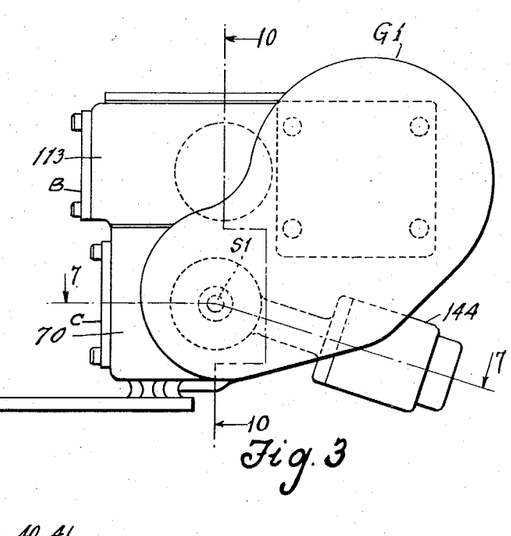
Fig. 3 is a view in the direction of arrow 3 of Fig. 2.

As shown in Figs. 1, 2 and 3, the reference letters A, B and C indicate removable cover plates which may be taken off to permit access to the interior of the housing 70.

Speed control

Figure 14:
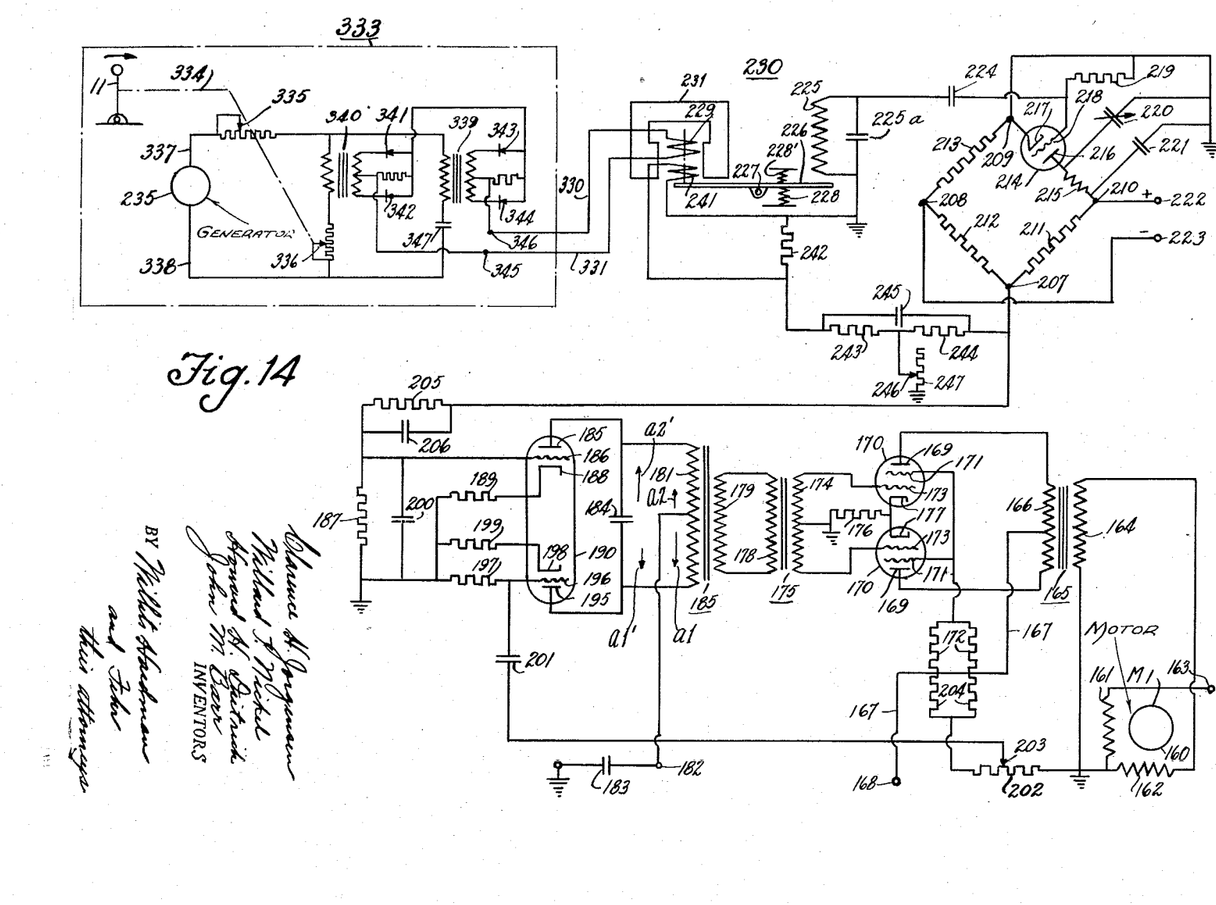
Figs. 14 and 15 are, respectively, wiring diagrams of the engine speed and engine temperature systems.

Motor M1, shown at the lower right hand corner of Fig. 14, is a two-phase motor having a squirrel cage rotor 160 and stator windings 161 and 162. Winding 161 is connected with insulated current source terminal 163 connected with a suitable A. C. source, for example, 54 volts, 400 cycles. The other terminal of this source is grounded. The winding 162 is connected in series with the secondary 164 of a transformer 165 having a primary 166 whose center tap is connected by wire 167 with the non-grounded terminal 168 of a D. C. source, preferably at 300 volts. The ends of primary 166 are connected with the plates 169 of push pull amplifier tubes 170, having grids 171 connected with voltage divider resistances 172 in parallel. Tubes 170 have grids 173 connected with the ends of the secondary winding 174 of a transformer 175, said winding having a center tap connected with ground and through a resistance 176 with the cathodes 177 of tubes 170. Transformer 175 has a primary winding 178 connected with the secondary winding 179 of a transformer 185 having a primary winding 181 whose center tap is connected with the non-grounded terminal 182 of another A. C. source, preferably 300 volts, 400 cycles. Terminal 182 is connected through condenser 183 to ground. The ends of primary winding 181 are connected with a condenser 184 and with the plates 185 and 195 of a double triode tube 190 having grids 186 and 196 connected to ground through resistances 187 and 197 respectively and cathodes 188 and 198 connected to ground through resistances 189 and 199 respectively. Grid 186 is connected to ground also through a condenser 200. Grid 196 is connected with a condenser 201 connected with a slider 203 of a variable resistance or rheostat 202 which is grounded at one end and is connected at the other end with wire 167 through voltage divider resistances 204.

Grid 186 is connected through an RC circuit including resistance 205 and condenser 206 with a terminal 207 which is one of the four terminals of a bridge circuit including also terminals 208, 209 and 210 and fixed resistances 211, 212 and 213 and a circuit of variable resistance which comprises an oscillator tube 214 and a choke 215 connected with terminal 210 and with plate 216 of the tube whose cathode 217 is connected with terminal 209 and whose grid 218 is connected through resistance 219 with ground. The ends of the choke 215 are connected with ground through a variable condenser 220 and a fixed condenser 221. Terminal 209 is connected with ground. The terminals 210 and 208 are connected, respectively, with plus terminal 222 and negative terminal 223 of a suitable D. C. source, preferably 300 volts. Normally, terminal 207 is at ground or zero potential. By changing the impedance of tube 214 the potential on terminal 207 can become negative or positive.

Grid 218 is connected through a condenser 224 with an oscillator coil 225 which is grounded and shunted by a condenser 225a. Coil 225 is part of a micro-sen unit 230 which includes a lever 226 of non-magnetizable conducting material such as copper, one end of which is in the field of the coil 225. Lever 226 is pivoted at 227 and springs 228 and 228' hold it in a neutral position. Lever 226 carries a coil 229 movable in a magnetic field produced by a permanent magnet 231. One end of coil 229 is connected to the speed selection network 333 by wire 330, and the other end of coil 229 is similarly connected by wire 331. The speed selection network is usually remotely mounted from the microsen amplifier unit, since the former requires a mechanical linkage with throttle 11. The mechanical linkage is indicated by the dot-dash line 334 and actuates variable resistance units 335 and 336. The speed selection network is essentially a frequency responsive bridge network which permits the generator 235 to be an A. C. unit. This arrangement is substantially insensitive to amplitude of the generator signal and, therefore, voltage drops in the usually long leads 337 and 338 between the generator and the selection network is not a part of the calibration. Frequency is unaffected by IR drop and is a direct function of engine speed. The manually operated control lever 11 also actuates the fuel throttle valve 7 (Fig. 1) through mechanical linkage indicated by the dot-dash line 334.

The microsen unit, indicated generally by number 230 is essentially a galvanometer arrangement which moves, its non-ferrous armature 226 either closer to or farther away from the coil 225. During any steady state condition of operation of the control, i. e., when the control is in balance and at rest, the microsen armature 226 is always held by springs 228 and 228' in the same neutral position with respect to coil 225. Now assume the throttle lever 11 has been advanced for a step function increase to some higher desired value of engine speed. Current flow through current transformer 339 will increase as the result of a decrease in resistance 335, whereas current flow through current transformer 340 will decrease relatively as the result of increase in resistance 336. Dry rectifiers 341, 342, 343 and 344 in both transformer secondary circuits rectify the A. C. wave of generator 235 to produce pulsating D. C. at the selection network output terminals 345 and 346. Capacitor 347 in series with its current transformer 339 provides additional capacitive reactance effect compared with resistance 336 in series with its current transformer 340. Quantitative values of resistance as determined by throttle position, inductance of the matched current transformers 339 and 340 and capacitance of condenser 347 are chosen to make the selection network frequency selective as a function of position of throttle 11 and generator 235 frequency. The resulting effect at terminals 345 and 346 is such that with movement of throttle 11 to increase speed the polarity of terminal 345 is more positive than terminal 346. Conversely, with decrease movement of throttle 11 to decrease speed, the polarity of terminal 346 is more positive than terminal 345. Thus, the direction of current flow through coil 229 of the microsen unit may be made to flow in either direction, dependent upon the chosen value of polarity of terminals 345 and 346. Assume for example, that movement of throttle 11 to increase speed causes terminal 345 to be positive with respect to terminal 346, current flows through coil 229 in a direction such that the resultant magnetic flux reacts with the magnetic flux of the permanent magnet 231 to move the coil and its attached armature 226 closer to coil 225 thereby causing increase in the amount of energy absorbed by coil 225 due to increase of eddy currents in lever 226. This effects a change in bias of grid 218 and the impedance of tube 214 such as to cause the potential of terminal 207 to become a negative value with respect to ground.

In the equilibrium status of the system when the turbine is on governed speed, the value of current in coil 229 is such that lever 226 is in such position relative to coil 225 that the circuit of the grid 218 of tube 214 is in tune, which means that resistance to direct current flow between terminals 210 and 209 is equal to the resistances of 211, 212, 213. Then the terminal 207 is at ground or zero potential. As the lever 226 moves from its equilibrium position closer to or further from the coil 225, the oscillator grid circuit is de-tuned thereby changing the impedance of tube 214 with respect to the D. C. component of current flow through it. The potential of terminal 207 with respect to ground varies negatively or positively in accordance with the direction and amount of speed change.

When the potential of terminal 207 is caused to become a negative value in response to movement of throttle 11 to a direction to effect speed increase, flow of fuel to the burners is increased. Through the amplifier system the winding 162 of motor M1 is so energized that the motor M1 will operate in the direction to cause the sleeve valve 60 (Fig. 1) to move down to cause its ports 63 to move below the land 34 of valve 33 thereby connecting the lower end of cylinder 21 with pressure fluid supply which raises the piston 20 and increases the compression of spring 19 so that the by-passing action of valve 15 is reduced and more fuel is supplied in the burners to effect the increase of speed. The lever 11 does not open the valve 7 quite far enough to obtain the fuel flow required for the demanded speed without decrease of by-passing action of valve 15. The additional amount of fuel needed for the demanded speed is obtained automatically by decrease of by-passing action of valve 15. When the demanded speed has been attained the frequency of generator 235 will have increased to a value such that the current in coil 229 has a zero value. Then the motor M1 will cease operating to lower the sleeve valve 60 and the decrease of by-passing action will cease.

To decrease turbine speed, lever 11 is moved counter-clockwise (Fig. 14) to move valve 7 toward closed position and to reset the desired frequency balance of the frequency selection network 303 to a lower value. The lever 226 moves away from coil 225 and less energy is absorbed in coil 225. Therefore the signal impressed on grid 218 is such that the terminal 207 becomes positive with respect to ground. Through the amplifying system coil 162 of motor M1 is so energized that the motor M1 rotates in the direction to effect lifting of the sleeve valve 60 relative to valve 33 so that fluid can escape from the cylinder 21 and the by-passing action will be increased, thereby further reducing the flow of fuel to the burners.

The movement of lever 11 to demand less speed does not effect the closing of valve 7 to the extent required to obtain the lower speed without increasing of by-passing action of valve 15. The further reduction of fuel flow to obtain the lesser speed is obtained automatically by increase of by-passing action of valve 15.

As the motor M1 operates either to lower or to raise the valve 60 the resistance of rheostat 202 is altered. This causes control of the bias of grid 196 of tube 190 in a manner such as to counteract undesirable motor characteristics so that the speed of the motor M1 will be more nearly commensurate with the magnitude of the signal received by grid 186 of tube 190. This is in effect, negative feedback which also stabilizes the control system.

Let $\phi$=displacement of valve 60, $n$ equals amount of speed change and $\dot{n}$ $$\left(\text{or } \frac{dn}{dt}\right)$$

equal the rate of change of speed. The system provides that $\phi$ is proportional to $n$ and $\dot{n}$ and equals $k_1 n + k_2 \dot{n}$, $k_1$ and $k_2$ being constants of the system. Since grid 186 is connected with terminal 207 through an RC circuit (resistance 205 and condenser 206) the signal produced on grid 186 is proportional to $n$ and $\dot{n}$.

The microsen unit 230 includes a feedback coil 241 also carried by a lever 226 and movable in the field of magnet 231. Coil 241 is paralleled by resistance 242 grounded at one end and coil 241 is connected with resistances 243 and 244 connected in series with terminal 207 and paralleled by condenser 245 and connected with the slider 246 of a grounded resistance 247. Coil 241 is sensitive to the amount and rate of change of potential of terminal 207 and the degree of its sensitivity is controlled by adjusting the slider 246 along the resistance 247.

While speed is increasing to meet the demand for increased speed, the current in coil 229 is in such direction to effect equilibrium value and the potential of 207 is decreasing negatively from a certain negative value toward zero. Therefore current in coil 241 decreases from a certain value toward zero. Coil 241 acts in opposition to coil 229. Therefore, the magnetism of coil 241 bucks the field of the permanent magnet field with a force which is initially relatively strong and which diminishes to zero as speed error or deviation from selected speed falls to zero. Initially, lever 226 will be closer to coil 225 than it would have been if coil 241 were not present. Therefore, the negative potential of terminal 207 is higher initially and the motor M1 operates initially faster to effect speed increase than would have been the case if coil 241 were not present. This is in effect negative feedback for the purpose of stabilization. As speed error diminishes, current in coil 229 decreases, the potential of terminal 207 decreases negatively and the bucking action of coil 241 decreases. Therefore the signal which causes operation of the motor for decreasing by-passing action of valve 15 is initially stronger than if coil 241 were not present; and it diminishes to zero as speed error falls to zero. Since coil 241 senses rate of speed increase, it produces an effect which causes the potential of terminal 207 to be in proportion to rate of speed increase as well as to amount of speed error.

While speed is decreasing to meet the demand for decreased speed, current in coil 229 is in such direction as to effect equilibrium value and the potential of terminal 207 is decreasing positively toward zero. Therefore, current in coil 241 decreases from a certain value toward zero. While the potential of terminal 207 is positive, coil 241 is so magnetized that it is attracted toward the field of permanent magnet 231. Initially, the lever 226 will be further from coil 225 than it would have been if coil 241 were not present. Therefore, initially, the positive potential of terminal 207 is greater and the motor M1 operates initially faster to effect speed decrease than would have been the case if coil 241 were not present. As speed error falls to zero, current in coil 209 decreases to equilibrium value; the positive potential of terminal 207 decreases to zero and attraction of coil 241 to the permanent magnet field decreases to zero. Therefore the signal which causes operation of the motor for increasing by-passing action of valve 15 is initially stronger than if coil 241 were not present; and it diminishes to zero as speed error falls to zero. Since coil 241 senses rate of speed decrease, it produces an effect which causes the potential of terminal 207 to be in proportion to rate of speed decrease as well as to amount of speed error.

Speed error coefficient $k_1$ is attributable to the relation of coils 229 and 241 and rate of change of speed error coefficient $k_2$ is attributable to the RC circuits respectively connecting terminal 207 with coil 241 and grid 186 of the tube 190.

It is understood that the reason why motor M1 runs in one direction when terminal 207 is negative with respect to ground and in the opposite direction when terminal 207 is positive with respect to ground is due to the following circumstances. The tube 190 is conductive only during the positive half-cycles of the A. C. wave at terminal 182. When the system is in balance, terminal 207 is at ground potential and grid 186 is at ground potential. Therefore since grid 196 is also at ground potential, the currents flowing in the halves of transformer primary 181 at any instant of the A. C. wave received at terminal 182 are equal and opposite and no current flows in coil 162 of motor M1. When 207 is biased negatively, the bias of grid 186 increases negatively and less current passes in the upper half of primary 181. The current which passes in the lower half of primary 181 therefore attains average value represented by arrow $a1$ during the time when the A. C. wave at terminal 182 is positive which is greater than the average value represented by arrow $a2$ attained in the upper half of primary 182 during the time when the A. C. wave at terminal 182 is positive. The net effect is value $a1$ less value $a2$ in the direction of arrow $a1$. Therefore the secondary 179 puts out a signal to coil 162 which causes it to receive a wave in phase with the wave on coil 161; and, motor M1 turns in the direction to increase fuel.

When terminal 207 is biased positively, the grid 186 is biased positively and more current will pass from plate 185 than from plate 195. Therefore, the current in the upper half of primary 181 will attain an average value represented by arrow $a2'$ which is greater than the average value represented by arrow $a1'$ flowing in the lower half of primary 181. The net effect is value $a2'$ less value $a1'$ in the direction of arrow $a1'$. Therefore, secondary 179 puts out a signal to coil 162 which causes it to receive a wave 180° out of phase with the wave on coil 161 and motor M1 turns in the direction to decrease fuel.

Referring to Fig. 8, even when the plunger 142 is fully retracted, its end portion 142a is within the V-notch of plate 140. Therefore, with respect to motor M1, an idle speed stop and a maximum speed stop are provided.

The speed control system effects a balance between the fuel flow and a selected speed. In case of speed error or deviation from selected speed, the system operates to reduce fuel flow to correct for over-speeding and to increase fuel flow to correct for under-speeding. The maximum permissible speed is limited by virtue of engagement of one side of the V-notch in plate 140 with the end portion 142a of plunger 142. However, if the maximum permissible turbine temperature is reached before maximum permissible speed is reached, the temperature control system to be described, takes over control and so limits fuel delivery that the maximum temperature will not be exceeded although the turbine speed is less than maximum.

*Temperature control*

Figure 15:
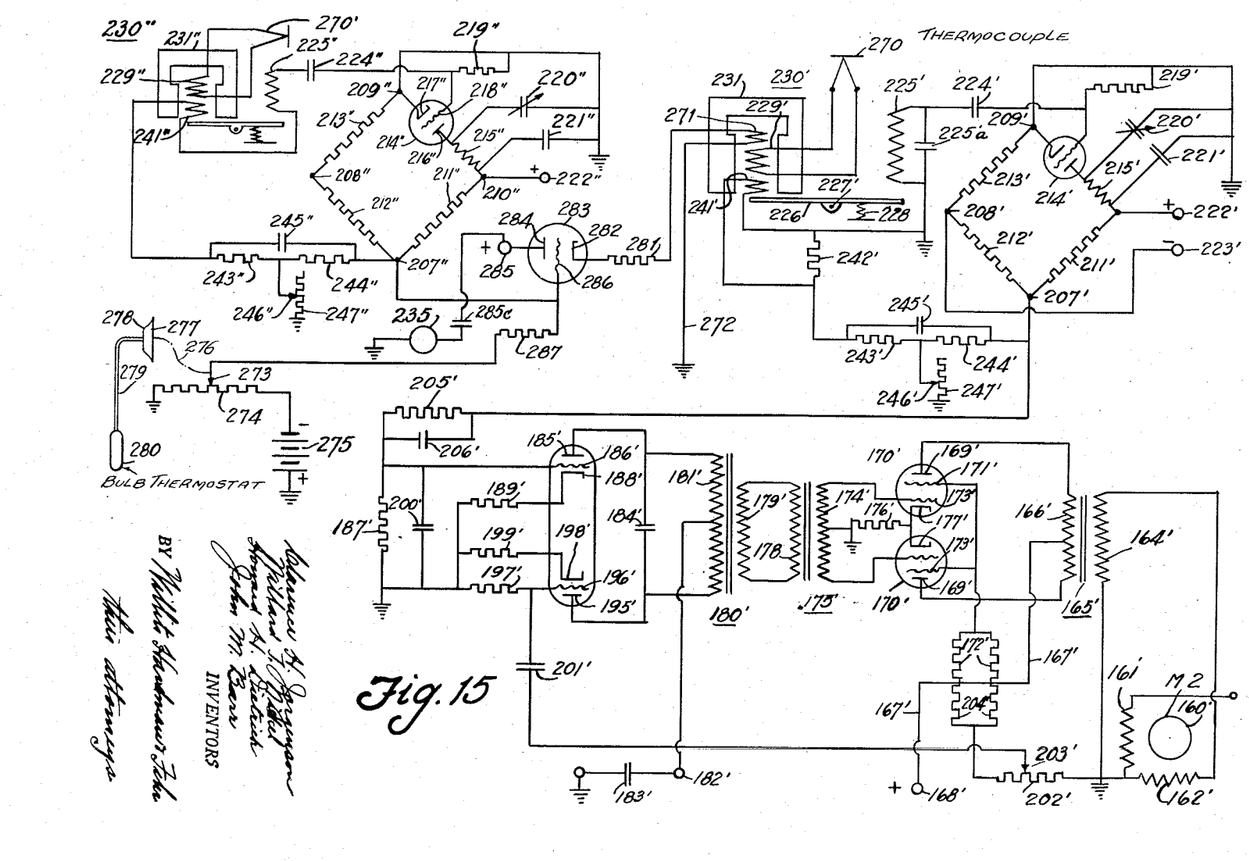

The temperature control of motor M2 (Fig. 15) is like that of the speed control of motor M1 (Fig. 14). Therefore, similar parts of the temperature control system, shown in Fig. 15, are referred to with the same reference numerals with primes affixed. Coil 229' of microsen 230' is connected with a thermocouple 270 which senses turbine exhaust gas temperature. The function of this system is to cause the motor M2 to increase fuel by-passing and decrease fuel flow to the burners when the temperature tends to exceed the maximum safe operating limit.

The temperature control system is set to limit fuel delivery so that the turbine temperature does not exceed a certain maximum, for example, 1250° F. At all lower temperatures, the motor M2 is effectively in stalled condition urging the plate 140 connected therewith in one direction against the associated plunger end 142a. When the temperature tends to exceed 1250° F., thermocouple 270 impresses on coil 229' a voltage such that terminal 207' is biased positively with respect to ground and motor M2 operates in a direction to reduce fuel flow by moving plate 140 (Fig. 8) in the opposite direction from plunger end 142a while causing valve 60 (Fig. 1) to be moved up to cause increase in by-passing action and reduction in fuel flow to the burners. During acceleration in speed, when the rate of change of temperature is sufficiently fast, a false signal is produced in the rate of change (RC) network which makes the amplifier think the temperature has reached 1250° F. or more and the motor M2 operates to check rate of increase of fuel delivery so that maximum temperature is not exceeded during speed increase. During steady state operation at maximum permissible temperature, the temperature control system governs in response to temperature error or deviation from maximum and the rate of change of temperature error.

*Modification of maximum permissible temperatures*

To utilize the full potential performance from the engine, maximum engine operating temperatures must be modified as a function of engine speed, absolute ambient air temperature and engine combustion gas temperature. The maximum permissible engine temperatures are rescheduled as a function of the above mentioned parameters according to the relation shown in the chart Fig. 16. In this chart, curves A, B, C and D show the relations between the exhaust gas absolute temperature and compressor speed for various compressor inlet absolute temperatures ranging from a certain low value for curve A to a certain high value for curve D. Temperature values above these curves are in the compressor surge range and temperature values below these curves are in the range of compressor operation without surge for various compressor inlet absolute temperatures, examples of which are represented by the curves A, B, C, D. Therefore, the exhaust gas temperatures for various speeds should not be in excess of the values represented by curves A, B, C and D.

To effect the control of fuel to prevent surge, a microsen unit 230″ is provided. The parts of the unit which are similar to parts of unit 230′ are indicated by similar reference numbers with double primes affixed. Terminal 207″ is connected to grid 286 of a tube 283 and to a resistance 287 connected to the slider 273 of a variable resistance 274 connected with ground and with the negative terminal of a battery 275 whose positive terminal is grounded. Slider 273 is connected by a mechanism represented by line 276 with a diaphgram 277 closing one side of a chamber 278 connected by a pipe 279 with a bulb 280 located in heat receiving relation to ambient air or to the air entering the compressor inlet. Chamber 278, pipe 279 and bulb 280 contain a liquid having relatively high thermal coefficient of expansion. Slider 273 moves right as the temperature sensed by bulb 280 increases, and moves left when this temperature decreases. Thus the bias on grid 286 of tube 283 is controlled in response to the temperature sensed by bulb 280 as well as by the polarity of terminal 207″ with respect to ground. Tachometer generator 235 (also in Fig. 14) is connected with ground and with a condenser 285C connected with terminal 285 connected with the plate 284 of tube 283. Cathode 282 of tube 283 is connected by resistance 281 with a coil 271 connected by wire 272 with ground. Therefore, the current passing to coil 271 is determined by the bias of grid 286. Coil 271 has a modifying effect on the operation of microsen unit 230′. Condenser 285C and coil 271 are matched impedances. When the voltage wave of the generator 235 is positive, pulse values of voltage will be impressed on plate 284 of tube 283. When the wave is negative, this tube does not conduct. It operates on positive half cycles of generator voltage.

Figure 16:
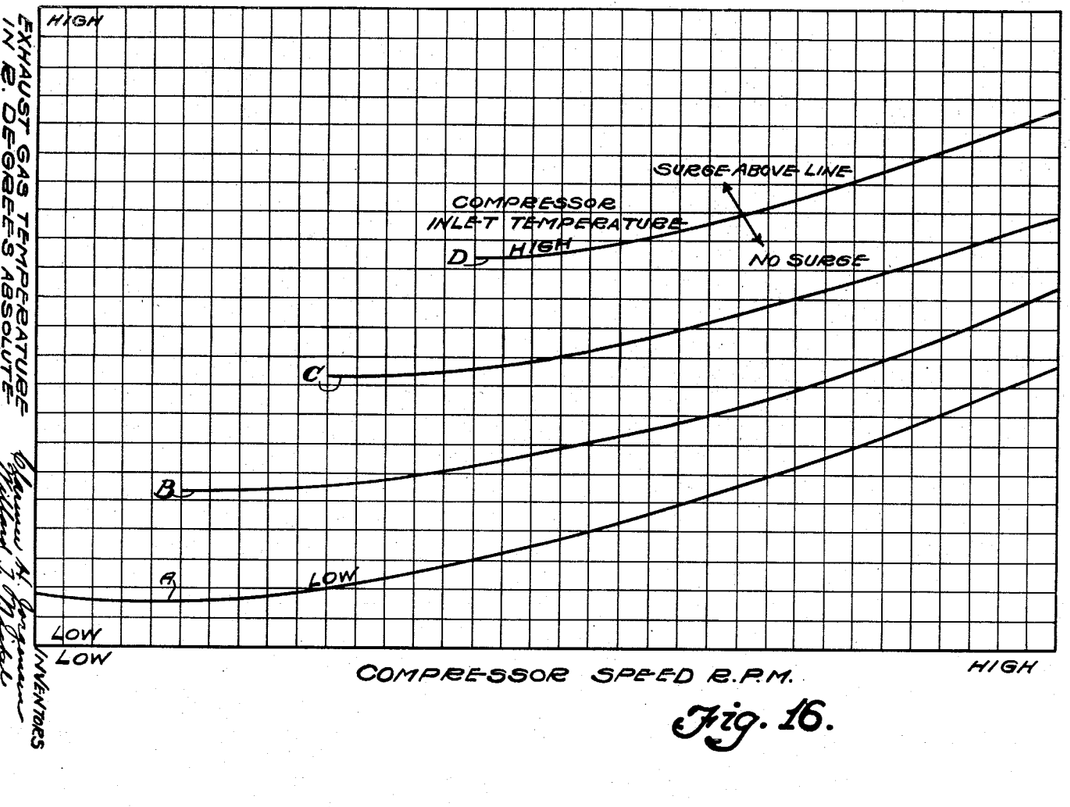
Fig. 16 is a chart showing relations between exhaust gas temperature and compressor speed for certain compressor inlet temperatures.

Because the slider 273 senses compressor inlet air temperature, the bias on grid 286 which slider 273 determines will determine which one of the schedules A, B, C or D or any of the intermediate schedules is the surge schedule or the relation of compressor speed to exhaust gas temperatures at which surge will begin. Plate 284 receives the speed signal and terminal 207″ receives the exhaust gas tempearture signal. When these two signals have the relation represented by the particular surge schedule for a given compressor inlet air temperature, coil 271 is conditioned to cause microsen unit 230′ to signal to terminal 207′ to reduce fuel, thereby causing motor M2 to operate in the direction to reduce fuel flow.

As speed increases, voltage on plate 284 increases. As compressor inlet temperature increases, the bias which battery 275 places on grid 286 increases negatively, thereby requiring more positive bias derived from terminal 207″ before tube 283 will conduct. Therefore, the allowable exhaust temperature, before surge is encountered, increases as speed increases and as compressor inlet temperature increases. When the exhaust temperature attains a value such that, with respect to speed, it is above the surge schedule curve for a particular compressor inlet air temperature, the bias on terminal 207″ is sufficiently positive to cause tube 283 to conduct and coil 271 receives current flowing in a direction such as to cause terminal 177′ of unit 230′ to be biased positively so that motor M2 turns in the direction to increase by-passing action to reduce fuel so that turbine exhaust temperature is reduced and surge is prevented.

The combined controls

The speed controlling system, the temperature controlling system, the apparatus sensing fuel manifold pressure and the apparatus sensing ambient air temperature operate jointly through the calculator to determine the position of the sleeve valve 60 (Fig. 1). The position of spool valve 33 is determined by apparatus which senses total compressor inlet pressure. Therefore, the by-passing of the fuel pressure pump is jointly controlled by the valves 33 and 60 in order that fuel delivery will be controlled in accordance with speed, temperature, fuel manifold pressure, ambient air temperature and altitude conditions.

In case of failure of the speed controlling system or the temperature controlling system to function properly, the motors M1 and M2 can be disconnected from their operating current source, or in case of failure of the motor operating current source, the calculator is automatically set in a position best suited for control of fuel flow in accordance with fuel manifold pressure, ambient air temperature and altitude conditions and manual control of the fuel throttle valve can be effected to prevent excessive speed and temperature. Therefore, in case of failure of the electrical apparatus to function properly, a safe landing of the aircraft can be effected.

While the embodiment of the present invention as herein disclosed, constitutes a preferred form, it is to be understood that other forms might be adopted.

What is claimed is as follows:

1. A fuel control apparatus for a gas turbine engine having a compressor, a fuel burner and a turbine, and a constant-displacement fuel pump driven by the engine supplying fuel to the burner, the fuel control comprising, in combination, means for bypassing fuel to the pump inlet, a valve connected to the fuel pump and the fuel burner movable in an increasing direction to increase fuel flow to the burner and decrease fuel bypassed to the pump inlet and movable in a decreasing direction to decrease fuel flow to the burner and increase fuel bypassed to the pump inlet, means responsive to turbine temperature connected to the valve operative to move the valve in the decreasing direction as temperature increases, and means responsive to the temperature of the ambient air and turbine speed connected between the turbine temperature responsive means and the valve operative to modify the effect of turbine temperature on the valve in accordance with engine compressor surge characteristics.

2. A fuel control apparatus for a gas turbine engine having a compressor, a fuel burner and a turbine, and a constant-displacement fuel pump driven by the engine supplying fuel to the burner, the fuel control comprising, in combination, means for bypassing fuel to the pump inlet, a valve connected to the fuel pump and the fuel burner movable in an increasing direction to increase fuel flow to the burner and decrease fuel bypassed to the pump inlet and movable in a decreasing direction to decrease fuel flow to the burner and increase fuel bypassed to the pump inlet, means responsive to the pressure of fuel supplied to the burners connected to the valve operative to move the valve in the increasing direction as the said fuel pressure increases, means responsive to the pressure of the air supplied to the engine connected to the valve operative to move the valve in the increasing direction as the said air pressure increases, means responsive to turbine temperature connected to the valve operative to move the valve in the decreasing direction as temperature increases, and means responsive to the temperature of the ambient air and turbine speed connected between the turbine temperature responsive means and the valve operative to modify the effect of turbine temperature on the valve in accordance with engine compressor surge characteristics.

3. A fuel control apparatus for a gas turbine engine having a compressor, a fuel burner and a turbine, and a constant-displacement fuel pump driven by the engine supplying fuel to the burner, the fuel control comprising, in combination, means for bypassing fuel to the pump inlet, a valve connected to the fuel pump and the fuel burner movable in an increasing direction to increase fuel flow to the burner and decrease fuel bypassed to the pump inlet and movable in a decreasing direction to decrease fuel flow to the burner and increase fuel bypassed to the pump inlet, means for setting the engine speed, means responsive to engine speed, means connected to the speed setting and speed responsive means and the valve operative to move the valve in the increasing direction when the setting exceeds the response and vice versa, and means responsive to turbine temperature connected to the valve operative to move the valve in the decreasing direction as temperature increases, and means responsive to the temperature of the ambient air and turbine speed connected between the turbine temperature responsive means and the valve operative to modify the effect of turbine temperature on the valve in accordance with engine compressor surge characteristics.

4. A fuel control apparatus for a gas turbine engine having a compressor, a fuel burner and a turbine, and a constant-displacement fuel pump driven by the engine supplying fuel to the burner, the fuel control comprising, in combination, means for bypassing fuel to the pump inlet, a valve connected to the fuel pump and the fuel burner movable in an increasing direction to increase fuel flow to the burner and decrease fuel bypassed to the pump inlet and movable in a decreasing direction to decrease fuel flow to the burner and increase fuel bypassed to the pump inlet, means for setting the engine speed, means responsive to engine speed, means connected to the speed setting and speed responsive means and the valve operative to move the valve in the increasing direction when the setting exceeds the response and vice versa, means responsive to the pressure of fuel supplied to the burners connected to the valve operative to move the valve in the increasing direction as the said fuel pressure increases, means responsive to the pressure of the air supplied to the engine connected to the valve operative to move the valve in the increasing direction as the said air pressure increases, means responsive to turbine temperature connected to the valve operative to move the valve in the decreasing direction as temperature increases, and means responsive to the temperature of the ambient air and turbine speed connected between the turbine temperature responsive means and the valve operative to modify the effect of turbine temperature on the valve in accordance with engine compressor surge characteristics.

5. A fuel control apparatus for a gas turbine engine having a compressor, a fuel burner and a turbine, and a constant-displacement fuel pump driven by the engine supplying fuel to the burner, the fuel control comprising, in combination, means for bypassing fuel to the pump inlet, a valve connected to the fuel pump and the fuel burner movable in an increasing direction to increase fuel flow to the burner and decrease fuel bypassed to the pump inlet and movable in a decreasing direction to decrease fuel flow to the burner and increase fuel bypassed to the pump inlet, means for setting the engine speed, means responsive to engine speed, means connected to the speed setting and speed responsive means and the valve operative to move the valve in the increasing direction when the setting exceeds the response and vice versa, means responsive to the pressure of fuel supplied to the burners connected to the valve operative to move the valve in the increasing direction as the said fuel pressure increases, means responsive to the pressure of the air supplied to the engine connected to the valve operative to move the valve in the increasing direction as the said air pressure increases, and means responsive to turbine temperature connected to the valve operative to move the valve in the decreasing direction as temperature increases.

6. An apparatus as recited in claim 1 in which the turbine speed and turbine temperature responsive means include electrical control circuits and means responsive to failure of the electrical control circuits for setting the responsive devices to a datum position.

7. Apparatus for controlling a jet engine having a turbine and fuel burners and a pump driven by the turbine for forcing fuel to the burners, said apparatus comprising a manually controlled fuel throttle valve connected with the pump outlet for controlling fuel flow to the burners, a by-pass for connecting the pump outlet and inlet, a by-pass valve for controlling the by-pass and urged into opening position by pump outlet pressure, a spring opposing opening of the valve, an hydraulic servo for variably stressing the spring, valve means for controlling the servo and including a sleeve valve and a spool valve within the sleeve valve, means sensitive to altitude pressure for controlling one of the latter valves, means sensitive to turbine speed for controlling the other of said latter valves and means sensitive to burner fuel pressure for controlling the other of said latter valves.

8. Apparatus for controlling a jet engine having a turbine and fuel burners and a pump driven by the turbine for forcing fuel to the burners, said apparatus comprising a manually controlled fuel throttle valve connected with the pump outlet for controlling fuel flow to the burners, a by-pass for connecting the pump outlet and inlet, a by-pass valve for controlling the by-pass and urged into opening position by pump outlet pressure, a spring opposing opening of the valve, an hydraulic servo for variably stressing the spring, valve means for controlling the servo and including a sleeve valve and a spool valve within the sleeve valve, means sensitive to altitude pressure for controlling one of the latter valves, means sensitive to turbine speed for controlling the other of said latter valves and means sensitive to ambient air temperature for controlling the other of said latter valves.

9. Apparatus for controlling a jet engine having a turbine and fuel burners and a pump driven by the turbine for forcing fuel to the burners, said apparatus comprising a manually controlled fuel throttle valve connected with the pump outlet for controlling fuel flow to the burners, a by-pass for connecting the pump outlet and inlet, a by-pass valve for controlling the by-pass and urged into opening position by pump outlet pressure, a spring opposing opening of the valve, an hydraulic servo for variably stressing the spring, valve means for controlling the servo and including a sleeve valve and a spool valve within the sleeve valve, means sensitive to altitude pressure for controlling one of the latter valves, means sensitive to turbine temperature for controlling the other of said latter valves and means sensitive to burner fuel pressure for controlling the other of said latter valves.

10. Apparatus for controlling a jet engine having a turbine and fuel burners and a pump driven by the turbine for forcing fuel to the burners, said apparatus comprising a manually controlled fuel throttle valve connected with the pump outlet for controlling fuel flow to the burners, a by-pass for connecting the pump outlet and inlet, a by-pass valve for controlling the by-pass and urged into opening position by pump outlet pressure, a spring opposing opening of the valve, an hydraulic servo for variably stressing the spring, valve means for controlling the servo and including a sleeve valve and a spool valve within the sleeve valve, means sensitive to altitude pressure for controlling one of the latter valves, means sensitive to turbine temperature for controlling the other of said latter valves and means sensitive to ambient air temperature for controlling the other of said latter valves.

11. Apparatus for controlling a jet engine having a turbine and fuel burners and a pump driven by the turbine for forcing fuel to the burners, said apparatus comprising a manually controlled fuel throttle valve connected with the pump outlet for controlling fuel flow to the burners, a by-pass for connecting the pump outlet and inlet, a by-pass valve for controlling the by-pass and urged into opening position by pump outlet pressure, a spring opposing opening of the valve, an hydraulic servo for variably stressing the spring, valve means for controlling the servo and including a sleeve valve and a spool valve within the sleeve valve, means sensitive to turbine speed for controlling the other of said latter valves, means sensitive to turbine temperature for controlling the other of said latter valves and means sensitive to burner fuel pressure for controlling the other of said latter valves.

12. Apparatus for controlling a jet engine having a turbine and fuel burners and a pump driven by the turbine for forcing fuel to the burners, said apparatus comprising a manually controlled fuel throttle valve connected with the pump outlet for controlling fuel flow to the burners, a by-pass for connecting the pump outlet and inlet, a by-pass valve for controlling the by-pass and urged into opening position by pump outlet pressure, a spring opposing opening of the valve, an hydraulic servo for variably stressing the spring, valve means for controlling the servo and including a sleeve valve and a spool valve within the sleeve valve, means sensitive to altitude pressure for controlling one of the latter valves, means sensitive to turbine speed for controlling the other of said latter valves, means sensitive to burner fuel pressure for controlling the other of said latter valves, and means sensitive to ambient air temperature for controlling the other of said latter valves.

13. Apparatus for controlling a jet engine having a turbine and fuel burners and a pump driven by the turbine for forcing fuel to the burners, said apparatus comprising a manually controlled fuel throttle valve connected with the pump outlet for controlling fuel flow to the burners, a by-pass for connecting the pump outlet and inlet, a by-pass valve for controlling the by-pass and urged into opening position by pump outlet pressure, a spring opposing opening of the valve, an hydraulic servo for variably stressing the spring, valve means for controlling the servo and including a sleeve valve and a spool valve within the sleeve valve, means sensitive to altitude pressure for controlling one of the latter valves, means sensitive to turbine speed for controlling the other of said latter valves, means sensitive to turbine temperature for controlling the other of said latter valves and means sensitive to ambient air temperature for controlling the other of said latter valves.

14. Apparatus for controlling a jet engine having a turbine and fuel burners and a pump driven by the turbine for forcing fuel to the burners, said apparatus comprising a manually controlled fuel throttle valve connected with the pump outlet for controlling fuel flow to the burners, a by-pass for connecting the pump outlet and inlet, a by-pass valve for controlling the by-pass and urged into opening position by pump outlet pressure, a spring opposing opening of the valve, an hydraulic servo for variably stressing the spring, valve means for controlling the servo and including a sleeve valve and a spool valve within the sleeve valve, means sensitive to altitude pressure for controlling one of the latter valves, means sensitive to turbine temperature for controlling the other of said latter valves, means sensitive to burner fuel pressure for controlling the other of said latter valves and means sensitive to ambient air temperature for controlling the other of said latter valves.

15. Apparatus for controlling a jet engine having a turbine and fuel burners and a pump driven by the turbine for forcing fuel to the burners, said apparatus comprising a manual controlled fuel throttle valve connected with the pump outlet for controlling fuel flow to the burners, a by-pass for connecting the pump outlet and inlet, a by-pass valve for controlling the by-pass and urged into opening position by pump outlet pressure, a spring opposing opening of the valve, an hydraulic servo for variably stressing the spring, valve means for controlling the servo and including a sleeve valve and a spool valve within the sleeve valve, means sensitive to altitude pressure for controlling one of the latter valves, means sensitive to turbine speed for controlling the other of said latter valves, means sensitive to turbine temperature for controlling the other of said latter valves, means sensitive to burner fuel pressure for controlling the other of said latter valves and means sensitive to ambient air temperature for controlling the other of said latter valves.

16. Apparatus for controlling the flow of fuel to a jet engine having a turbine and fuel burners, a source of fuel, a conduit interconnecting the fuel source and the burners and a pump for supplying fuel from the source through the conduit to the burners; including in combination, a manually operable throttle valve in the conduit for controlling fuel flow to the burners, a bypass valve operatively connected with the conduit between the pump and the throttle valve, said bypass valve having a connection with the fuel source for diverting a portion of the fuel flow in the conduit back to the source, and means operatively connected to and controlling said bypass valve for controlling the amount of fuel diverted from said conduit back to said fuel source in response to turbine speed comprising an electric motor operable to position the bypass valve, an A. C. generator producing an output signal having a frequency proportional to turbine speed, a frequency responsive network having a selected speed setting energized by said generator signal and having an output which varies in response to variations in turbine speed from the selected speed setting, an electric bridge circuit controlled by the output of said frequency responsive network for producing an output signal proportional to the speed error of the turbine from the selected speed setting of the frequency responsive network and an amplifier circuit controlled by the output signal of said bridge circuit for energizing said electric motor to thereby position said bypass valve and maintain turbine speed at the selected speed setting.

17. Apparatus for controlling the flow of fuel to a jet engine having a turbine and fuel burners, a source of fuel, a conduit interconnecting the fuel source and the burners and a pump for supplying fuel from the source through the conduit to the burners; including in combination, a manually operable throttle valve in the conduit for controlling fuel flow to the burners, a bypass valve operatively connected with the conduit between the pump and the throttle valve, said bypass valve having a connection with the fuel source for diverting a portion of the fuel flow in the conduit back to the source, and means operatively connected to and controlling said bypass valve for controlling the amount of fuel diverted from said conduit back to said fuel source in response to turbine speed comprising an electric motor operable to position the bypass valve, an A. C. generator producing an output signal having a frequency proportional to turbine speed, a frequency responsive network having a selected speed setting energized by said generator signal and having an output which varies in response to variations in turbine speed from the selected speed setting, an electric bridge circuit controlled by the output of said frequency responsive network for producing an output signal proportional to the speed error of the turbine from the selected speed setting of the frequency responsive network, a differentiating circuit for modifying the output signal of the bridge circuit in response to the rate of change of turbine speed and an amplifier circuit controlled by the modified output signal of said bridge circuit for energizing said electric motor to thereby position said bypass valve and maintain turbine speed at the preselected speed setting.

18. Apparatus for controlling the flow of fuel to a jet engine having a turbine and fuel burners, a source of fuel, a conduit interconnecting the fuel source and the burners and a pump for supplying fuel from the source through the conduit to the burners; including in combination, a throttle valve in the conduit for controlling fuel flow to the burners, a bypass valve operatively connected with said conduit between the pump and the throttle valve, said bypass valve having a connection with the fuel source for diverting a portion of the fuel flow in said conduit back to the source, means operatively connected to and controlling said bypass valve for controlling the amount of fuel diverted from said conduit back to said fuel source in response to turbine speed comprising an electric motor operable to position said bypass valve, an A. C. generator producing an output signal having a frequency proportional to turbine speed, a frequency responsive network having a selected speed setting energized by said generator signal and having an output which varies in response to variations in turbine speed from said selected speed setting, an electric bridge circuit controlled by the output of said frequency responsive network for producing an output signal proportional to the speed error of the turbine from the selected speed setting of the frequency responsive network and an amplifier circuit controlled by the output signal of said bridge circuit for energizing said electric motor to thereby position said bypass valve and maintain turbine speed at the selected speed setting, and a manually operable member connected with said throttle valve and with said frequency responsive network for varying the position of said throttle valve and varying the selected speed setting of said frequency responsive network.

19. Apparatus of the character set forth in claim 18 wherein said means for controlling the bypass valve includes a differentiating circuit connected with said bridge circuit for modifying the output signal of the bridge circuit in response to the rate of change of turbine speed from the selected speed setting.

20. Apparatus of the character set forth in claim 18 wherein the means for controlling said bypass valve includes a second electric motor, and circuit means for energizing said second electric motor in response to variations in turbine exhaust temperature.

21. Apparatus of the character set forth in claim 20 wherein the means for energizing said second electric motor comprises a thermocouple subjected to turbine exhaust temperature for producing an electrical signal, a second electric bridge circuit controlled by the electrical signal of the thermocouple and an amplifier circuit controlled by said second bridge circuit for energizing said second electric motor to override control of the bypass valve by the first electric motor when the turbine exhaust temperature exceeds a predetermined maximum.

22. A control system for a fuel bypass valve in apparatus for controlling a jet engine having a turbine and fuel burners, said apparatus comprising a source of fuel, a conduit interconnecting the fuel source and the burners, a pump in the conduit for supplying fuel to the burners, a throttle valve in the conduit and bypass means including a bypass valve connected with the conduit between the pump and the throttle valve for diverting a portion of the fuel flow in the conduit back to the fuel source; including in combination, means producing an A. C. signal having a frequency proportional to turbine speed, a frequency responsive network having a selected speed setting energized by said A. C. signal and having and output which varies in response to deviations in turbine speed from the selected speed setting, and electrical means controlled by the output of the frequency responsive network for controlling the position of said bypass valve to maintain turbine speed at the selected speed setting.

23. A control system for a fuel bypass valve in apparatus for controlling a jet engine having a turbine and fuel burners, said apparatus comprising a source of fuel, a conduit interconnecting the fuel source and the burners, a pump in the conduit for supplying fuel to the burners, a throttle valve in the conduit and bypass means including a bypass valve connected with the conduit between the pump and the throttle valve for diverting a portion of the fuel flow in the conduit back to the fuel source; including in combination, means producing an A. C. signal having a frequency proportional to turbine speed, a frequency responsive network having a selected speed setting energized by said A. C. signal and having an output which varies in response to deviations in turbine speed from the selected speed setting, electrical means controlled by the output of the frequency responsive network for controlling the position of the bypass valve to maintain turbine speed at the selected speed setting, and manually operable means to vary the speed setting of said frequency responsive network.

24. A control system for a fuel bypass valve in apparatus for controlling a jet engine having a turbine and fuel burners, said apparatus comprising a source of fuel, a conduit interconnecting the fuel source and the burners, a pump in the conduit for supplying fuel to the burners, a throttle valve in the conduit and bypass means including a bypass valve connected with the conduit between the pump and the throttle valve for diverting a portion of the fuel flow in the conduit back to the fuel source; including in combination, means producing an A. C. signal having a frequency proportional to turbine speed, a frequency responsive network having a selected speed setting energized by said A. C. signal and having an output which varies in response to deviations in turbine speed from the selected speed setting, an electric bridge circuit controlled by the output of the frequency responsive network for producing an output signal proportional to the speed error of the turbine from the selected speed setting, and electrical means controlled by the output signal of said bridge circuit for controlling the position of said bypass valve to maintain turbine speed at the selected speed setting.

25. A control system for a fuel bypass valve in apparatus for controlling a jet engine having a turbine and fuel burners, said apparatus comprising a source of fuel, a conduit interconnecting the fuel source and the burners, a pump in the conduit for supplying fuel to the burners, a throttle valve in the conduit and bypass means including a bypass valve connected with the conduit between the pump and the throttle valve for diverting a portion of the fuel flow in the conduit back to the fuel source; including in combination, means for producing an A. C. signal having a frequency proportional to turbine speed, a frequency responsive network having a selected speed setting energized by said A. C. signal and having an output which varies in response to deviations in turbine speed from the selected speed setting, a normally balanced electric bridge circuit, means controlled by the output of said frequency responsive network in response to variations in turbine speed from the selected speed setting for unbalancing said electric bridge circuit to produce an output signal from said bridge circuit proportional to the speed error of the turbine from the selected speed setting, a differentiating circuit for modifying the output signal of the bridge circuit in response to the rate of change of turbine speed, and electrical means controlled by the modified output signal of the electrical bridge for positioning said bypass valve to maintain turbine speed at the selected speed setting.

26. The control system set forth in claim 25 wherein the means for unbalancing said electric bridge circuit comprises a micro-sen unit.

27. The control system set forth in claim 25 including second electrical means for positioning said bypass valve, and means for energizing said second electrical means to override the electrical means controlled by turbine speed in response to a predetermined turbine exhaust temperature.

28. The control system set forth in claim 27 wherein said last recited means includes means for modifying the maximum permissible turbine exhaust temperature to prevent surging.

References Cited in the file of this patent

UNITED STATES PATENTS

| | | |
|---|---|---|
| 2,219,994 | Jung | Oct. 29, 1940 |
| 2,246,686 | Jones | June 24, 1941 |

(Other references on following page)

UNITED STATES PATENTS

| | | |
|---|---|---|
| 2,273,652 | Maxson et al. | Feb. 17, 1942 |
| 2,275,317 | Ryder | Mar. 3, 1942 |
| 2,285,204 | Hall et al. | June 2, 1942 |
| 2,295,998 | Maxson et al. | Sept. 15, 1942 |
| 2,374,844 | Stokes | May 1, 1945 |
| 2,422,808 | Stokes | June 24, 1947 |
| 2,438,998 | Halford | Apr. 6, 1948 |
| 2,474,033 | Chamberlin et al. | June 21, 1949 |
| 2,503,048 | Ifield | Apr. 4, 1950 |
| 2,538,605 | Udale | Jan. 16, 1951 |
| 2,545,856 | Orr | Mar. 20, 1951 |
| 2,557,526 | Bobier et al. | June 19, 1951 |
| 2,581,275 | Mock | Jan. 1, 1952 |
| 2,581,276 | Mock | Jan. 1, 1952 |
| 2,581,870 | Larsen | Jan. 8, 1952 |
| 2,584,230 | Schaefer | Feb. 5, 1952 |
| 2,598,674 | Burgess | June 3, 1952 |
| 2,599,507 | Wyckoff | June 3, 1952 |
| 2,616,254 | Mock | Nov. 4, 1952 |
| 2,622,393 | Edwards et al. | Dec. 23, 1952 |
| 2,648,194 | Jorgensen et al. | Aug. 11, 1953 |
| 2,673,556 | Reggio | Mar. 30, 1954 |
| 2,688,229 | Lee | Sept. 7, 1954 |
| 2,698,654 | Jorgensen et al. | Jan. 4, 1955 |
| 2,746,247 | Bevins | May 22, 1956 |

FOREIGN PATENTS

| | | |
|---|---|---|
| 967,703 | France | Apr. 5, 1950 |

UNITED STATES PATENT OFFICE
CERTIFICATE OF CORRECTION

Patent No. 2,852,913                  September 23, 1958

Clarence H. Jorgensen et al.

It is hereby certified that error appears in the printed specification of the above numbered patent requiring correction and that the said Letters Patent should read as corrected below.

Column 4, line 34, for "lug 82"" read -- lug 82' --; column 17, line 55, for "and output" read -- an output --; column 18, line 13, for "jump" read -- pump --.

Signed and sealed this 5th day of May 1959.

(SEAL)
Attest:
KARL H. AXLINE

Attesting Officer

ROBERT C. WATSON
Commissioner of Patents